United States Patent
De Bijl et al.

(10) Patent No.: US 10,426,674 B2
(45) Date of Patent: Oct. 1, 2019

(54) SECURING SYSTEM FOR WHEELCHAIRS IN A VEHICLES AND A METHOD FOR UNLOCKING AND LOCKING A SECURING SYSTEM FOR WHEELCHAIRS IN VEHICLES

(71) Applicant: CARBOUW B.V., Veghel (NL)

(72) Inventors: Sjoerd Hendrik De Bijl, Mariahout (NL); Xando Henricus Petrus Quirijnen, Rijen (NL); Marcel Johannes Hendrikus Schouten, Nijmegen (NL)

(73) Assignee: CARBOUW B.V. (NL)

( * ) Notice: Subject to any disclaimer, the term of this patent is extended or adjusted under 35 U.S.C. 154(b) by 178 days.

(21) Appl. No.: 15/514,427

(22) PCT Filed: Sep. 25, 2015

(86) PCT No.: PCT/NL2015/050669
§ 371 (c)(1),
(2) Date: Mar. 24, 2017

(87) PCT Pub. No.: WO2016/048154
PCT Pub. Date: Mar. 31, 2016

(65) Prior Publication Data
US 2017/0296406 A1      Oct. 19, 2017

(30) Foreign Application Priority Data

Sep. 26, 2014 (NL) ...................................... 2013527

(51) Int. Cl.
*B60P 7/08*   (2006.01)
*A61G 3/08*   (2006.01)
(Continued)

(52) U.S. Cl.
CPC ............. *A61G 3/0808* (2013.01); *A61G 3/08* (2013.01); *A61G 5/10* (2013.01); *B60P 3/06* (2013.01); *B60P 7/08* (2013.01); *B60P 7/0823* (2013.01)

(58) Field of Classification Search
CPC .......... A61G 3/0808; A61G 5/10; A61G 3/08; B60P 7/0823; B60P 7/08; B60P 3/06; B60N 2/02
(Continued)

(56) References Cited

U.S. PATENT DOCUMENTS

| 7,040,847 B1 | 5/2006 | Cardona |
| 2006/0110230 A1 | 5/2006 | Girardin |

(Continued)

FOREIGN PATENT DOCUMENTS

| EP | 2777667 A2 | 9/2014 |
| JP | 2012-126005 A | 7/2012 |
| NL | 9201844 A | 5/1994 |

OTHER PUBLICATIONS

International Search Report and Written Opinion in International Application No. PCT/NL2015/050669, dated Feb. 17, 2016.

*Primary Examiner* — Stephen T Gordon
(74) *Attorney, Agent, or Firm* — Katten Muchin Rosenman LLP (57) ABSTRACT

Securing system for wheelchairs in vehicles, comprising a rigid bottom frame provided with; —a number of fixation elements which are connected to the if bottom frame and suitable for fixing a wheelchair relative to the bottom frame, wherein each fixation elements comprises a coupling element configured for coupling to a wheelchair, which coupling element is connected with a cable to a retractor, which retractor in unlocked mode exerts a retracting pulling force on the coupling element while the cable can be pulled out, and in locked mode locks the cable so that it cannot be pulled (Continued)

out, wherein the retractors are fixedly connected to the bottom frame and are preferably placed adjacently of each other, and a central securing control for simultaneous operation of the retractors.

15 Claims, 6 Drawing Sheets

(51) Int. Cl.
*A61G 5/10* (2006.01)
*B60P 3/06* (2006.01)

(58) Field of Classification Search
USPC .......... 410/7–12, 21–23, 51, 100; 248/499, 248/503.1; 296/65.04; 297/DIG. 4
See application file for complete search history.

(56) References Cited

U.S. PATENT DOCUMENTS

| | | | |
|---|---|---|---|
| 2007/0154275 A1* | 7/2007 | Jeppsson | A61G 3/0808 |
| | | | 410/7 |
| 2008/0247837 A1 | 10/2008 | Cardona | |
| 2014/0271020 A1* | 9/2014 | Girardin | B60P 7/0823 |
| | | | 410/23 |

* cited by examiner

SECURING SYSTEM FOR WHEELCHAIRS IN A VEHICLES AND A METHOD FOR UNLOCKING AND LOCKING A SECURING SYSTEM FOR WHEELCHAIRS IN VEHICLES

This application is a U.S. National Phase Application of PCT/NL2015/050669, filed Sep. 25, 2015, which claims priority to Netherlands Application No. 2013527, filed Sep. 26, 2014, the entire contents of which are hereby incorporated by reference.

The present invention relates to a securing system for wheelchairs in vehicles, comprising a rigid bottom frame provided with a number of fixation means which are connected to the bottom frame and suitable for fixing a wheelchair relative to the bottom frame, wherein each fixation means comprises a coupling element configured for coupling to a wheelchair, which coupling element is connected with a cable to a retractor, wherein the retractors are fixedly connected to the bottom frame.

Such systems are for instance applied in vans which are configured to transport persons in wheelchairs. These systems can be applied equally well in other vehicles, such as in trains, buses, boats, aircraft and so on. It is important during transport that the wheelchairs are held firmly fixed in place, or in other words 'securely disposed'. Ambulatory aids such as rollators or pushchairs for children can also be fixed with this system, wherein the vehicles also comprise seats for the persons themselves.

A suitable coupling means comprises a hook suitable for hooking onto a wheelchair. The hook can optionally be provided with a closing mechanism. Diverse alternative coupling means can also be applied, such as a buckle, loop or a bolt-nut connection and so on.

The cable can be any type of elongate connecting means which can be rolled up and unrolled in simple manner, such as a band or a belt. An important property here is that the cable has very little to substantially no stretch.

The retractor is for instance embodied as a reel onto which the cable winds automatically under a retracting pulling force, for instance originating from a spring force. Another term for retractor is automatic rolling-up device.

A number of fixation means is required in order to achieve sufficient fixation of a wheelchair in a vehicle. These fixation means have to be locked during transport. The fixation means are unlocked in order to release the wheelchairs from the securing system after transport and while the coupling means are being connected to the wheelchairs before transport takes place.

It has been found in practice that there is room for improvement of the operation of the retractors which are used per wheelchair.

Firstly, it is time-consuming to set each retractor individually in an unlocking position or locking position. This method can moreover have an undesired result, for instance because the wheelchair can move freely on one side while not yet being able to do so on another side.

There is moreover a considerable risk of a retractor unintentionally being set in unlocking position because the known securing systems allow a retractor to be unlocked with a single operation or movement.

The object of the invention is to obviate or limit one or more of the above stated drawbacks.

It therefore relates according to a first aspect of the invention to a securing system for wheelchairs in vehicles, comprising a rigid bottom frame provided with:

a number of fixation means which are connected to the bottom frame and
suitable for fixing a wheelchair relative to the bottom frame,
wherein each fixation means comprises a coupling element configured for coupling to a wheelchair, which coupling element is connected with a cable to a retractor, which retractor in unlocked mode exerts a retracting pulling force on the coupling element while the cable can be pulled out, and in locked mode locks the cable so that it cannot be pulled out,
wherein the retractors are fixedly connected to the bottom frame and are preferably placed adjacently of each other, and
a central securing control for simultaneous operation of the retractors.

Such a securing system results in an easy and reliable operation of the securing system, which is an improvement relative to the known systems. The mutually adjacent placing of the retractors simplifies the simultaneous operation of the retractors here, so that the central securing control can be of relatively simple and compact design, with all the associated advantages. In this respect the term 'mutually adjacently' is understood to mean that the retractors are placed a short distance adjacently of each other.

The securing system according to the invention is advantageously suitable for securing not only wheelchairs but also mobility scooters, pushchairs, stretchers and rollators in vehicles, as well as for securing cargo in general in vehicles.

It is particularly recommended here that the retractor in locked mode not only locks the cable so that it cannot be pulled out, but that this mode simultaneously allows the retractor to also exert a retracting pulling force on the coupling element. The locking is thus effective only in the outgoing direction, so that the cables automatically tighten again in the case of any small movement of the fixed wheelchair during transport.

The bottom frame of the securing system according to the invention preferably has a front side and a rear aside, wherein one or more fixation means are disposed so as to fix a wheelchair from the front side of the bottom frame, and one or more fixation means are disposed so as to fix a wheelchair from the rear side of the bottom frame.

The securing system thus provides the option of fixing a wheelchair on the front side and rear side, this producing a good fixation result. It is recommended here that two fixation means are disposed at the front and two fixation means at the rear.

It is advantageous in the securing system according to the invention that the retractors are mechanically controllable by the central securing control. This results in a simple, robust and reliable embodiment.

It is further recommended in the securing system according to the invention that the central securing control is movable between an unlocking position, in which the retractors are in unlocked mode, and a locking position in which the retractors are in locked mode. Such end positions are thus immediately recognizable to the user, and simplify operation.

It is also recommended that in the securing system according to the invention the central securing control is movable from a locking position to an unlocking position via two different successive movements. The movement to an unlocking position is thus a combination of two different movements, whereby the risk of unintentional unlocking is reduced because a combined, and therefore complicated, operation has to be carried out by the user. The movement consists for instance of a tilting movement which transposes into a translating movement.

The tilting movement can advantageously be supported by a spring force.

In the securing system according to the invention the central securing control is preferably movable from an unlocking position to a locking position via a single movement. This is advantageous because the locking can be performed in quick and uncomplicated manner by a single operation by the user.

In a preferred embodiment of the securing system according to the invention the central securing control is held in the securing position by a closing means provided in the securing system. The closing means is preferably embodied here such that an additional operation is required of a user to move the central securing control from the locking position to the unlocking position. The closing means can be a clamp or slidable latch. This adds an additional safety in respect of setting the securing control in unlocking position, since the securing control has as it were to be released first before the movement to an unlocking position can be made.

In a particular embodiment the central securing control, once the securing control has been released by opening the closing means, is movable from a locking position to an unlocking position via two different movements, wherein the first movement is performed automatically, for instance through a spring force. A total of two operations are thus required of the user to move the central securing control from the locking position to the unlocking position.

The slidable latch is preferably spring-loaded so that the closing means is automatically set to closing position. Thus achieved is that the securing control can be moved from the unlocking position to the locking position by the user by performing a single operation.

The closing means is preferably embodied such that it can be operated by a user using his/her foot.

In the securing system according to the invention the central securing control is preferably held in the unlocking position by a cam provided in the securing system. A deliberate movement of the securing control is thus necessary to release the unlocking position, and this cannot take place spontaneously. The cam takes for instance a bendable form or, conversely, a tiltable form in order to make it possible to release the unlocking position.

According to a special embodiment of the securing system according to the invention, the central securing control is movable within a guide contour provided in the bottom frame; wherein the central securing control comprises an actuator which is disposed in guidable manner within the guide contour, while the actuator is connected rotatably to a control plate for simultaneous operation of the retractors. The actuator is preferably connected rotatably here to an intermediate body which is fixedly connected to the control plate. The control plate makes direct contact with a pin on a retractor, whereby the locking and unlocking of the retractor is adjusted.

It is additionally recommended here that the actuator of the central securing control is held in the locking position by a closing means provided in the securing system. The same details as already elucidated above apply to the closing means.

In the securing system according to the invention the control plate is preferably held in the unlocking position by a cam provided in the securing system. A deliberate movement of the securing control is therefore necessary to release the unlocking position, and this cannot take place spontaneously. The cam takes for instance a bendable form or, conversely, a tiltable form in order to make it possible to release the unlocking position.

In the securing system according to the invention the central securing control is preferably embodied such that it can be set in the locking position and the unlocking position by a user using his/her foot. This simplifies the operation for the user, who is generally standing upright during locking and unlocking of a wheelchair.

It is subsequently recommended that in the securing system according to the invention the bottom frame is embodied as two elongate bottom profiles, each extending in the length between front and rear side of the bottom frame, which bottom profiles are connected to the rear side of the bottom frame by a central bottom construction in which the retractors and the central securing control are received. The arrangement of the retractors in the central bottom construction simplifies the construction of the central securing control because it can take a compact form. The bottom profiles provide a suitable provision for the purpose of disposing fixation means on the front side.

It is particularly recommended here that the cables of fixation means, which are disposed so as to fix a wheelchair from the front side of the bottom frame, are carried via the bottom profiles through to the front side of the bottom frame. Cables are thus protected by the bottom profiles.

It is particularly recommended here that the profiles on the front side of the bottom frame are provided with cable guides for guiding a cable of a fixation means. This cable guide guides a cable past a fixed point when a wheelchair is secured or fixed with the fixation means.

It is advantageous in the securing system according to the invention that the bottom profiles lie in the same horizontal plane and at a small angle to each other, so that together they form a V-shape. It has been determined that this construction is very robust in respect of the pulling forces exerted thereon, in the direction of the wheelchair and according to the set guidelines, when a wheelchair is being fixed.

It is further advantageous in the securing system according to the invention that the central bottom construction is provided with a cover plate, which cover plate is provided with an access to the central securing control. A securing system is thus provided which can be received in a floor of a vehicle while no provisions need be made for the accessibility of the central securing control.

In respect of installation of the securing system according to the invention in a vehicle, it is recommended that the bottom frame is provided with mounting points for mounting the bottom frame in the floor of a vehicle. As alternative to mechanical mounting, the securing system is preferably adhered to the underside of the floor in a vehicle.

An additional advantage of the securing system according to the invention lies in the bottom frame being provided with fastening means for a seatbelt for a passenger in a wheelchair.

A subsequent additional advantage of the securing system according to the invention is achieved in that one or more retractors are provided with a motion sensor. With a view to safety it is thus possible to detect the extent to which sufficient pulling force is exerted by the retractors when the system is in use. The sensor can take a mechanical or electronic form.

According to a second aspect the invention relates to a floor for a vehicle which is provided with a securing system according to the invention. The above described advantages likewise apply to such a floor.

According to a third aspect the invention relates to a vehicle, a floor part of which is provided with a securing system according to the invention. The above described advantages likewise apply to such a vehicle.

According to a fourth aspect the invention relates to a method for unlocking and locking a securing system for wheelchairs in vehicles,
which securing system comprises:
a rigid bottom frame provided with a number of fixation means which are connected to the bottom frame and suitable for fixing a wheelchair relative to the bottom frame, and a central securing control for simultaneous operation of the fixation means, comprising the step of:
setting the central securing control in respectively an unlocking position or locking position,
wherein the central securing control is movable from a locking position to an unlocking position via two different movements.

The above described advantages likewise apply to such a method, particularly the advantage that the movement to an unlocking position is a combination of two different movements, whereby the risk of unintentional unlocking is reduced. The movement consists for instance of a tilting movement which transposes into a translating movement.

The tilting movement can advantageously be supported by a spring force.

According to a fifth aspect the invention relates to a use of a securing system according to the first aspect of the invention, comprising the step of setting the central securing control to respectively an unlocking position or locking position.

The above described advantages of the securing system according to the different preferred embodiments likewise apply to such a method, particularly the advantage of an easy and reliable operation of the securing system by the central securing control.

The invention will be elucidated hereinbelow with reference to the accompanying figures, in which.

Corresponding components are designated in the different figures with the same reference numerals.

Figure 1A:
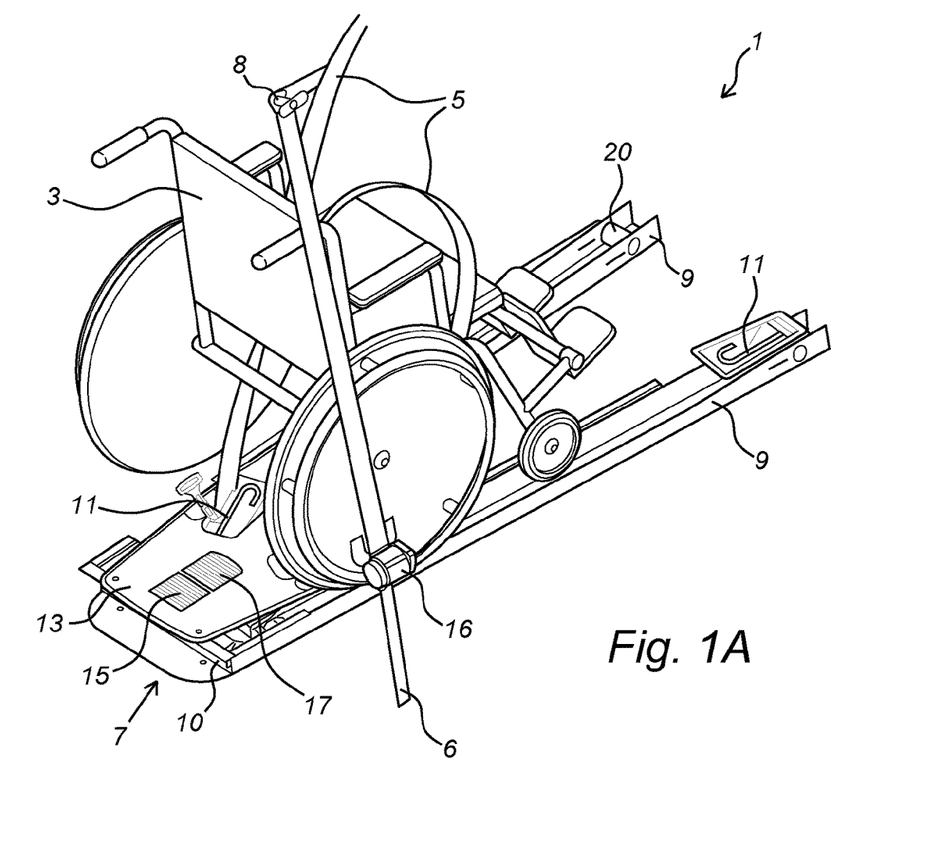
FIG. 1A is a perspective view of a preferred embodiment of the invention.

FIG. 1A shows a securing system 1 according to the invention with a wheelchair 3 shown thereabove. Wheelchair 3 supports on a transparent floor (not shown) on which securing system 1 is mounted. The wheelchair and the securing system are shown with front and rear side in the same direction. A number of seatbelts 5 can be tensioned over the wheelchair in order to strap the person into the wheelchair. Seatbelts 5 are guided from a tensioner 6 including automatic seatbelt 16 and via a guide 8 over the wheelchair to a fixed point on bottom frame 7. Bottom frame 7 is constructed from two bottom profiles 9 which are tubular and which are each provided on the front side with a coupling means 11 in the form of a hook 11 (only shown for the right-hand side) with which the wheelchair can be secured from the front side. A roller-like guide 20 is present on the front side (only shown on the left-hand side) for guiding a cable to which hook 11 is connected. On the rear side bottom profiles 9 are mutually connected with a central bottom construction 10 on which is provided a cover plate 13 which protects underlying components. Provided in the cover plate are hooks (only shown on the left-hand side) which can secure the wheelchair from the rear side. Provided in the cover plate is a central securing control 15 which can be held in locking position by a closing means 17. Securing control 15 is a tiltable body which can be moved with the foot and closing means 17 is a slidable body which can also be moved with the foot.

Figure 1B:
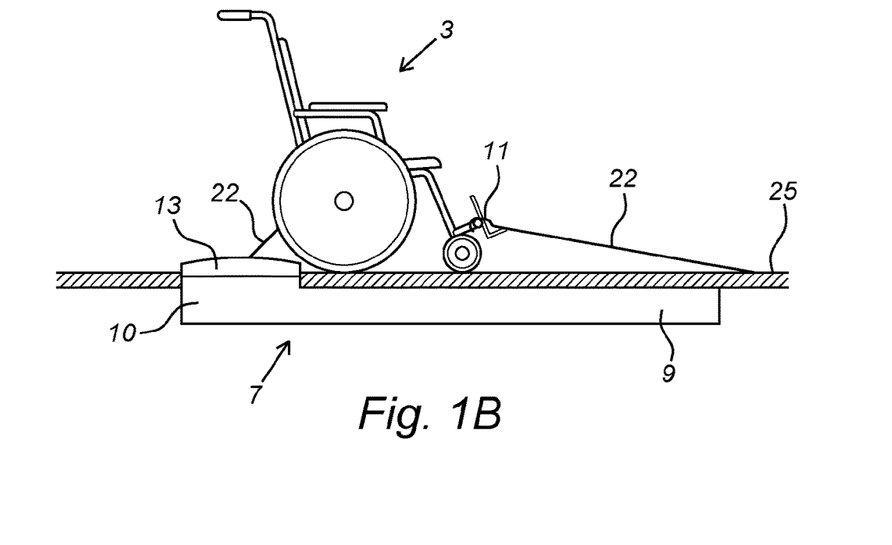
FIG. 1B is a side view in partial cross-section of the invention according to FIG. 1A.

FIG. 1B shows a schematic side view in partial cross-section of the invention according to FIG. 1A, which shows that bottom frame 7 is attached to the underside of vehicle floor 25 such that the central bottom construction is freely accessible through an opening in the floor, this part being covered by cover plate 13. Cables 22 are unrolled, wherein hooks 11 are hooked onto wheelchair 3 so that it is fixed to floor 25.

Figure 2:
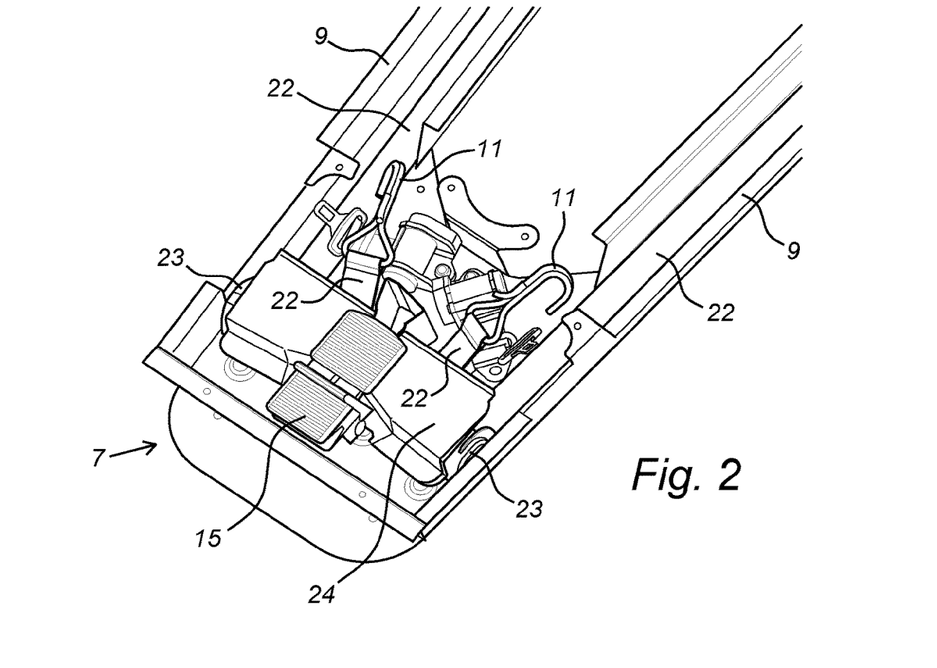
FIG. 2 is a top view of components of the invention according to FIG. 1A.

FIG. 2 shows the rear part of the securing system of FIG. 1, wherein cover plate 13 has been removed from the central bottom construction 7. Cables 22 in the form of belts of material usual for seatbelts are guided through the two bottom profiles 9. The two cables 22 are guided on either side to the corresponding retractors 23. Two retractors are present (not shown) under control plate 24 and are disposed between the two visible retractors 23 such that the four retractors are disposed substantially in one line parallel to each other. Control plate 24 has the function of setting the retractors simultaneously in respectively an unlocked or locked position. Connected to the two middle retractors are the two middle cables 22 to which respectively the middle and rear two hooks 11 are connected. Control plate 24 is moved via the central securing control 15.

Figure 3:
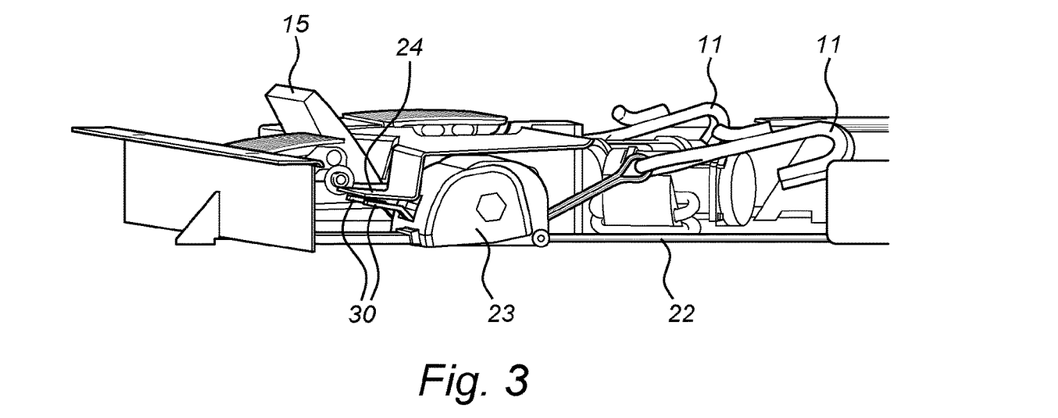
FIG. 3 is a cut-away side view of parts of the component shown in FIG. 2.

FIG. 3 shows the rear part of FIG. 2 in side view for the purpose of elucidating the arrangement of control plate 24 relative to retractors 23. The outer right-hand retractor 23 has a protruding pin 30 which, when pressed downward, unlocks the retractor so that cable 22 can be pulled out while a retracting pulling force is exerted thereon. In the shown position of pin 3 the retractor is on the other hand locked so that cable 22 cannot be pulled out while a retracting pulling force is exerted thereon. Shown further to the left in the figure is a second pin 30 which forms part of a middle right-hand retractor (not shown, and disposed directly adjacently of the visible retractor) which is also in locked position. Both the shown pins 30 are unlocked substantially simultaneously by a downward movement of control plate 24. The left-hand side of the central bottom construction 7 takes a symmetrical form relative to the centre line of the construction with two likewise disposed left-hand retractors, which are respectively locked or unlocked mechanically by the same control plate 24. It is thus possible to unlock or lock the four retractors simultaneously.

Figure 4A:
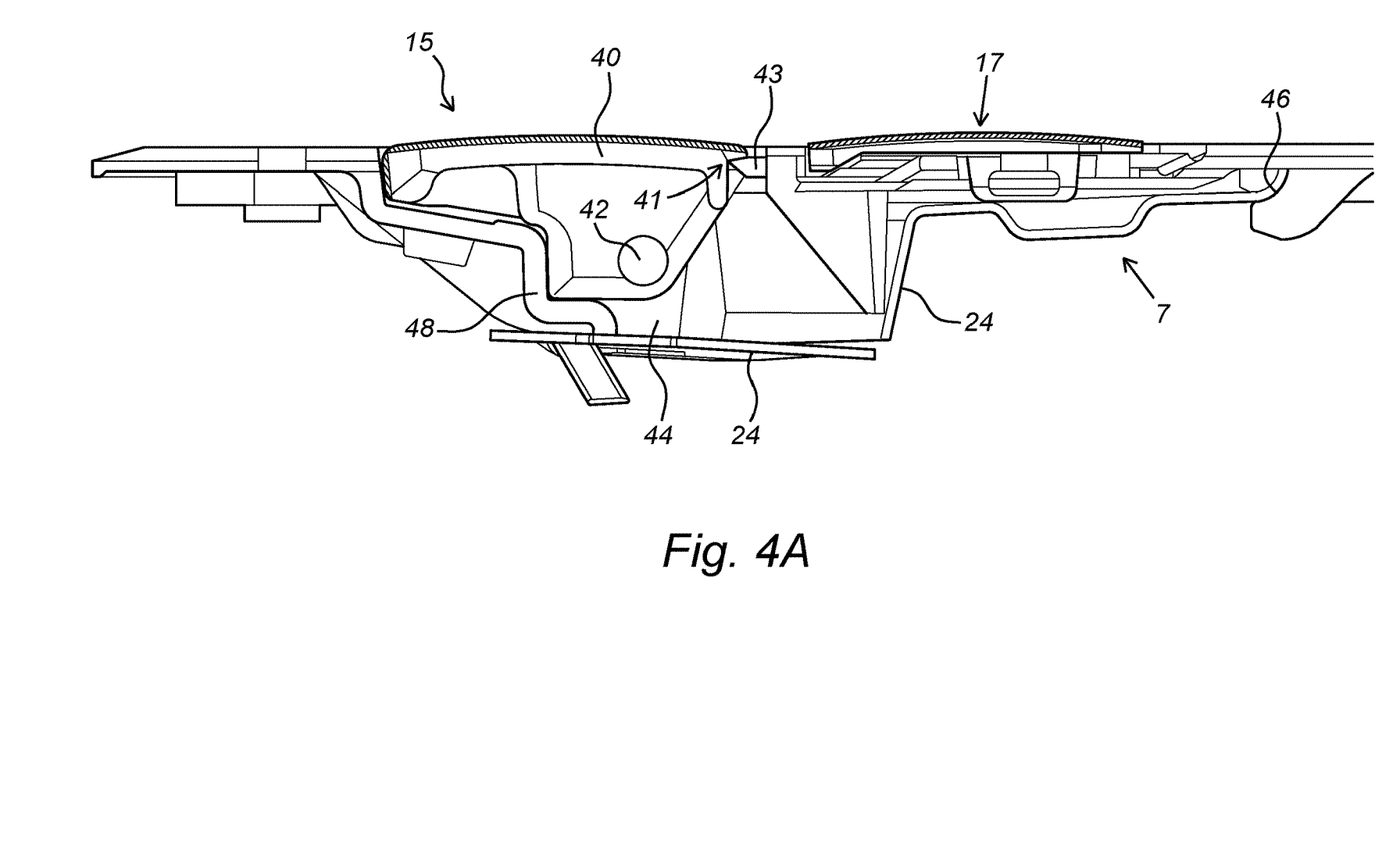
FIGS. 4A, 4B and 4C show cross-sections of the central securing control according to a preferred embodiment of the invention in locking position (4A), intermediate position (4B) and unlocking position (4C)

FIG. 4A shows the central securing control 15 in locking position. Securing control 15 comprises a folded-down actuator 40 which is connected rotatably via a rotation shaft 42 to an intermediate body 44 which is connected to control plate 24 for the purpose of simultaneous operation of the retractors. The control plate is anchored tiltably in the central bottom construction 7 at a clamping point 46, which allows a slight tilting movement of the control plate. In the shown position of the bottom plate it has not yet been moved downward, so that the pins (not shown) of underlying retractors are still unmoved and are in locked position (corresponding to the arrangement shown in FIG. 3). Actuator 40 is disposed in guidable manner inside a guide contour 48 provided in bottom frame 7. The position of slide 17 is further such that extension 43 protrudes into recess 41 of actuator 40. The slide is held in this position by a spring (not shown).

Figure 4B:
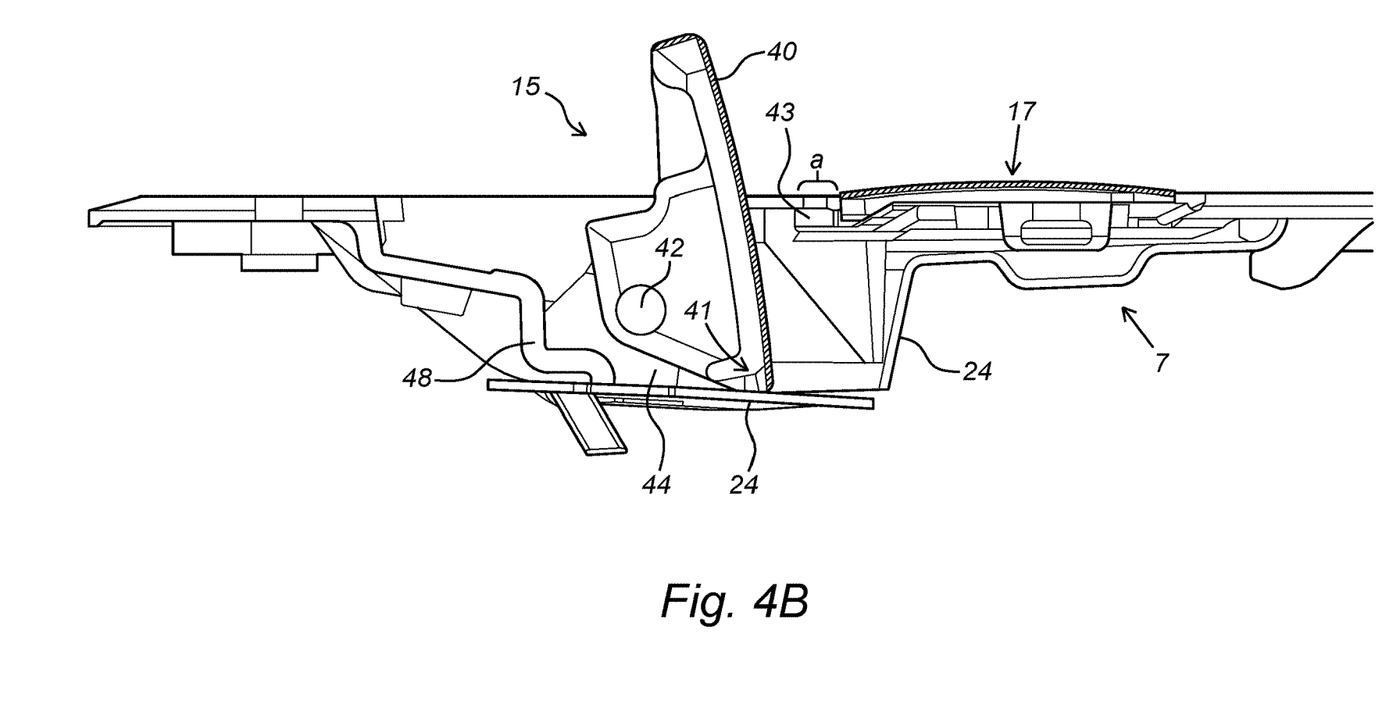

FIG. 4B shows the central securing control 15 in an intermediate position, before an unlocking position is reached and wherein the retractors are still in locked position. The intermediate position consists of actuator 40 being brought into tilting position in that i) slide 17 is moved forward over a distance a so that extension 43 of slide 17 is moved out of recess 41, whereby the actuator can tilt freely over rotation shaft 42 ii) the actuator is tilted forward with the foot and/or by a torsion spring arranged at the rotation shaft.

The control plate is still in the same position relative to bottom construction 7 as in FIG. 4A.

Figure 4C:
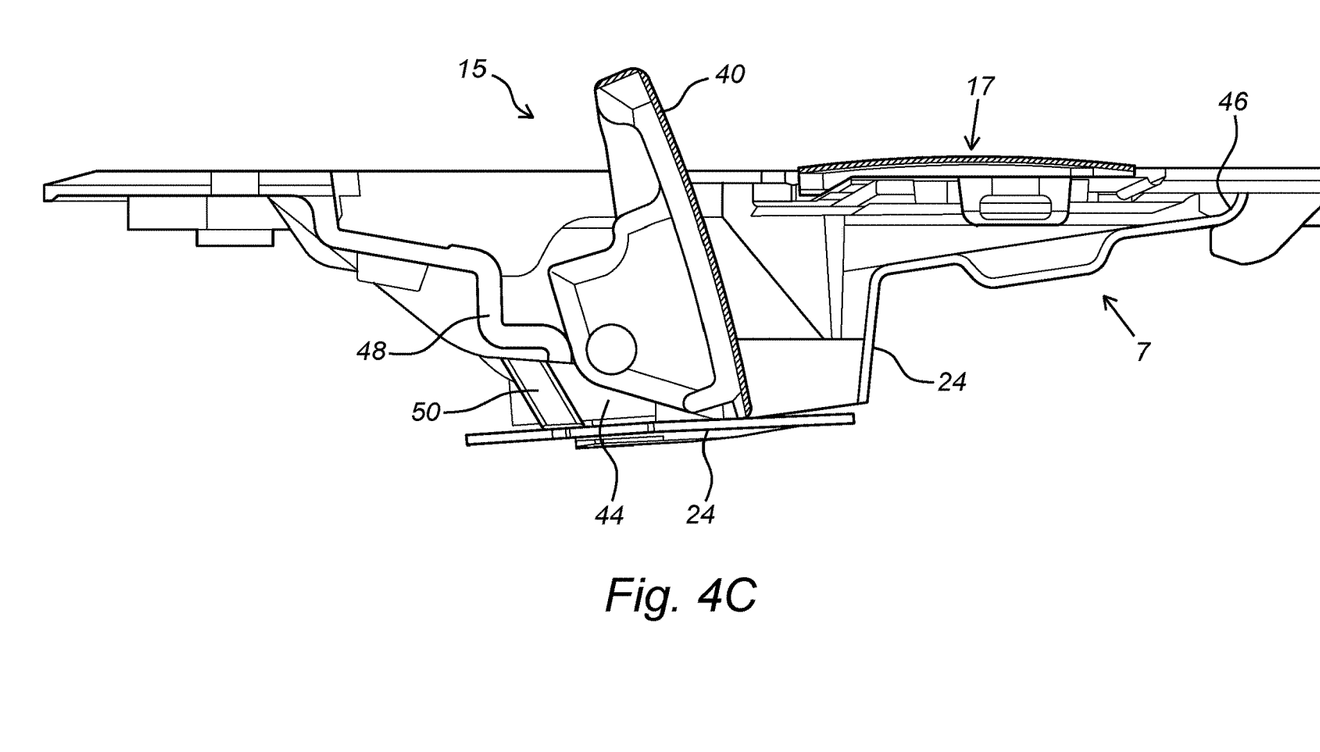

FIG. 4C shows the central securing control 15 in unlocking position. This is reached by simply pressing actuator 40 downward along guide profile 48 so that intermediate body 44 and control plate 24 move downward. The control plate tilts to some extent here because of the anchoring at the position of clamping point 46. The control plate moves along an obliquely placed cam 50 in the form of a protruding finger, behind which control plate 24 hooks in the final position of the unlocking position as shown in the figure. In the shown embodiment the cam takes a bendable form in order to make it possible to release the unlocking position.

From the unlocking position the securing control can then be brought into the locking position in simple manner by tilting actuator 40 rearward with the foot, wherein in this single movement:

i) the control plate moves along cam 50 through bending of the cam, ii) actuator 40 is brought into horizontal locking position of FIG. 4A, and iii) the spring-loaded slide 17 automatically closes the locking position of the actuator.

Figure 5:
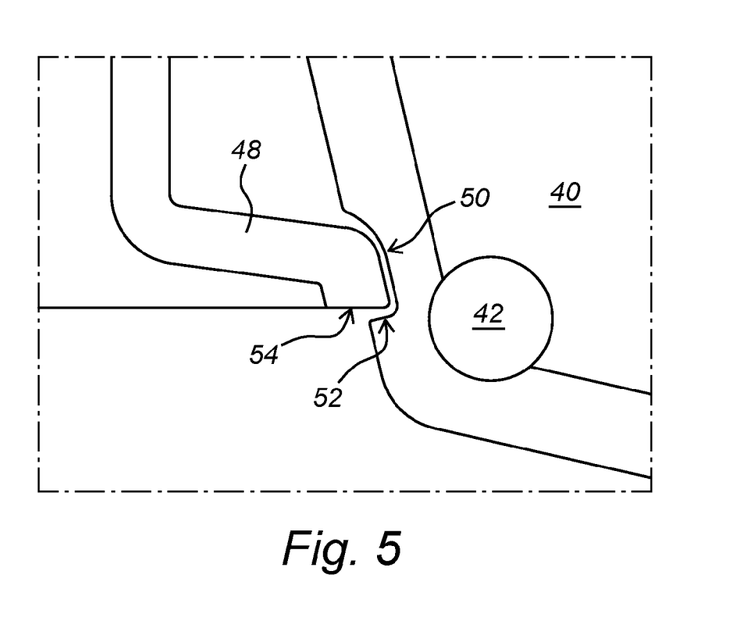
FIG. 5 shows in cross-section a detail of the central securing control according to a preferred embodiment of the invention in the unlocking position.

FIG. 5 shows a detail of a variant of the central securing control as shown in FIG. 4A-4C. The variant consists of the outer surface of actuator 40 being provided with a recess 50 close to rotation shaft 42. In the unlocking position, when the actuator is tilted into vertical position (such as for instance in FIG. 4C), this recess achieves that a wall part 52 of the recess hooks behind outer end 54 of guide profile 48. FIG. 5 thus shows an alternative embodiment of a cam 50 as shown in FIG. 4C.

The invention claimed is:

1. A securing system for wheelchairs in vehicles, comprising a rigid bottom frame provided with;

one or more fixation elements which are connected to the bottom frame and suitable for fixing a wheelchair relative to the bottom frame, wherein the one or more fixation elements comprise a coupling elements configured for coupling to a wheelchair, the coupling elements are connected with cables to one or more retractors, and the one or more retractors in an unlocked mode exert a retracting pulling force on the coupling elements while the cables can be pulled out, and in a locked mode lock the cables so that the cables cannot be pulled out, and wherein the retractors are fixedly connected to the bottom frame and are placed adjacently of each other, and a central securing control for simultaneous operation of the retractors, wherein the central securing control is movable within a guide contour provided in the bottom frame, and the central securing control comprises an actuator which is disposed in guidable manner within the guide contour, while the actuator is connected rotatably to a control plate for simultaneous operation of the retractors.

2. The securing system as claimed in claim 1, wherein the bottom frame has a front side and a rear side, and the one or more fixation elements are disposed so as to fix a wheelchair from the front side of the bottom frame, and the one or more fixation elements are disposed so as to fix a wheelchair from the rear side of the bottom frame.

3. The securing system as claimed in claim 1, wherein the retractors are mechanically controllable by the central securing control.

4. The securing system as claimed in claim 1, wherein the central securing control is movable between an unlocking position in which the retractors are in the unlocked mode, and a locking position in which the retractors are in the locked mode.

5. The securing system as claimed in claim 1, wherein the central securing control is movable from a locking position to an unlocking position via two different movements.

6. The securing system as claimed in claim 1, wherein the central securing control is movable from an unlocking position to a locking position via a single movement.

7. The securing system as claimed in claim 1, wherein the central securing control is held in a securing position by a slide provided in the securing system, and the slide is embodied here such that another operation is required of a user to move the central securing control from a locking position to an unlocking position.

8. The securing system as claimed in claim 1, wherein the central securing control is held in an unlocking position by a cam provided in the securing system.

9. The securing system as claimed in the foregoing claim 1, wherein the actuator of the central securing control is held in a locking position by a slide provided in the securing system.

10. The securing system as claimed in claim 1, wherein the control plate is held in an unlocking position by a cam provided in the securing system.

11. The securing system as claimed in claim 1, wherein the central securing control is embodied such that the central securing control can be set in a locking position and an unlocking position by a user using his/her foot.

12. The securing system as claimed in claim 1, wherein the bottom frame is embodied as at least two elongate bottom profiles, each extending longitudinally between the front and rear sides of the bottom frame, and the bottom profiles are connected to the rear side of the bottom frame by a central bottom construction in which the retractors and the central securing control are received.

13. The securing system as claimed in claim 12, wherein the cables of the one or more fixation elements, which are disposed so as to fix a wheelchair from the front side of the bottom frame, are carried via the bottom profiles through to the front side of the bottom frame.

14. The securing system as claimed in claim 12, wherein the bottom profiles lie in a plane, which is substantially parallel to the bottom frame, and at a small angle to each other, so that together they form a V-shape.

15. The securing system as claimed in claim 1, wherein the one or more retractors are provided with a motion sensor.

* * * * *